(12) United States Patent
Lakshmikantha et al.

(10) Patent No.: US 8,274,896 B2
(45) Date of Patent: Sep. 25, 2012

(54) VIRTUAL QUEUE

(75) Inventors: Ashvin Lakshmikantha, San Jose, CA (US); Mohan Kalkunte, Saratoga, CA (US); Bruce Kwan, Sunnyvale, CA (US)

(73) Assignee: Broadcom Corporation, Irvine, CA (US)

(*) Notice: Subject to any disclaimer, the term of this patent is extended or adjusted under 35 U.S.C. 154(b) by 160 days.

(21) Appl. No.: 12/253,038

(22) Filed: Oct. 16, 2008

(65) Prior Publication Data

US 2009/0122698 A1    May 14, 2009

Related U.S. Application Data

(60) Provisional application No. 60/980,338, filed on Oct. 16, 2007.

(51) Int. Cl.
*G06F 11/00* (2006.01)
(52) U.S. Cl. ................... 370/235.1; 370/428
(58) Field of Classification Search ............ 370/235.1, 370/233, 428; 707/8
See application file for complete search history.

(56) References Cited

U.S. PATENT DOCUMENTS 6,970,426 B1 * 11/2005 Haddock ............... 370/235.1
2004/0054924 A1 * 3/2004 Chuah et al. ............ 713/201

OTHER PUBLICATIONS

"A Single Rate Three Color Marker", Request for Comments: 2697, Network Working Group, Sep. 1999.

* cited by examiner

*Primary Examiner* — Chandrahas Patel
(74) *Attorney, Agent, or Firm* — Brake Hughes Bellermann LLP (57) ABSTRACT

An apparatus comprising a virtual queue configured to virtually receive virtual data units as the data units are actually received by a real queue. In various embodiments, the virtual queue may include a token counter decrementor configured to, as an entering data unit virtually enters the virtual queue, attempt to allocate the entering data unit to either the committed burst or the excess burst and decrement either the committed token counter (CTC) or the excess token counter (ETC) respectively. In one embodiment, a token counter incrementer configured to, as a data unit virtually exits the virtual queue, increment one of the token counters. In some embodiments, the virtual queue may include a congestion indicator configured to categorize the entering data unit. In various embodiments, the virtual queue may be configured to provide congestion feedback information based, at least in part, upon the state of the CTC & ETC.

23 Claims, 5 Drawing Sheets

| Committed Token Count 302 | Excess Token Count 304 | Color or Category 306 | Decrement Committed Token Counter? 308 | Decrement Excess Token Counter? 310 |
|---|---|---|---|---|
| > 0 | > 0 | Green (1$^{st}$) | No | Yes |
| > 0 | 0 | Yellow (2$^{nd}$) | Yes | No |
| 0 | > 0 | ... | ... | ... |
| 0 | 0 | Red (3$^{rd}$) | No | No |

FIG. 4
400

| Previous Packet Color | Committed Token Count | Excess Token Count | Color or Grade | Decrement Committed Token Counter? | Decrement Excess Token Counter? |
|---|---|---|---|---|---|
| Green (1st) | > 0 | > 0 | Green (1st) | No | Yes |
| Green (1st) | > 0 | 0 | Yellow (2nd) | Yes | No |
| Green (1st) | 0 | > 0 | --- | --- | --- |
| Green (1st) | 0 | 0 | Red (3rd) | No | No |
| Yellow (2nd) | > 0 | > 0 | Yellow (2nd) | No | Yes |
| Yellow (2nd) | > 0 | 0 | Yellow (2nd) | Yes | No |
| Yellow (2nd) | 0 | > 0 | --- | --- | --- |
| Red (3rd) | > 0 | > 0 | Red (3rd) | No | No |
| Red (3rd) | > 0 | 0 | Red (3rd) | No | Yes |
| Red (3rd) | 0 | > 0 | Red (3rd) | Yes | No |
| Red (3rd) | 0 | 0 | --- | --- | --- |
| | | | Red (3rd) | No | No |

502 Setting either a committed burst size or an excess burst size are equal to a threshold value

↓

504 Maintaining a count of committed tokens wherein the committed tokens represent the available bytes that may be allocated to a committed burst

↓

506 Maintaining a count of excess tokens wherein the excess tokens represent the available bytes that may be allocated to a excess burst

↓

508 As a data unit enters a queue, decrementing either the committed token count or the excess token count

↓

510 As the data unit enters the queue, assigning a categorization to the data unit

↓

512 As the data unit is scheduled to exit the queue, incrementing either the committed token count or the excess token count

↓

514 Wherein the incrementing and decrementing occur such that all the tokens associated with the threshold sized burst are allocated before all the tokens associated with the non-threshold sized burst are allocated

↓

VIRTUAL QUEUE

CROSS-REFERENCE TO RELATED APPLICATION

This application claims the benefit under 35 U.S.C. §119 (e) of U.S. Provisional Patent Application Ser. No. 60/980,338, filed Oct. 16, 2007. The entire disclosure of U.S. Provisional Application 60/980,338 is incorporated by reference herein in its entirety.

TECHNICAL FIELD

This description relates to the processing of network traffic, and more specifically, the categorizing of data units within a network environment.

BACKGROUND

In computer networking literature, digital bandwidth often refers to data rate measured in bits/second or occasionally bytes/second. Often the bandwidth of a network connection is artificially reduced to a rate lower than that theoretically possible over the carrier medium. This may be done for a variety of reasons. One such reason is quality of service issues. In one example, the network connection may share the carrier medium with a number of other network connections. Therefore, a bandwidth sharing scheme may be arranged such that each network connection is likely to have enough available bandwidth for their needs.

In some instances a network device may categorize or, more colloquially, "color" the traffic flow through the device. As a packet or other quantization of data passes through a network device, the device may determine whether or not the packet may be transmitted within the bandwidth restrictions imposed upon or by the device. In some instances, based upon that determination the packet may be categorized or colored. Frequently, these packets may be modified, such that their category or color information is encoded into the packet's header.

In one instance, the device or another component of the device may then take appropriate action based upon the coloring of the packet. In another instance, an external device may take an action based upon the coloring of the packet.

SUMMARY

The details of one or more implementations are set forth in the accompanying drawings and the description below. Other features will be apparent from the description and drawings, and from the claims.

DETAILED DESCRIPTION

Figure 1:
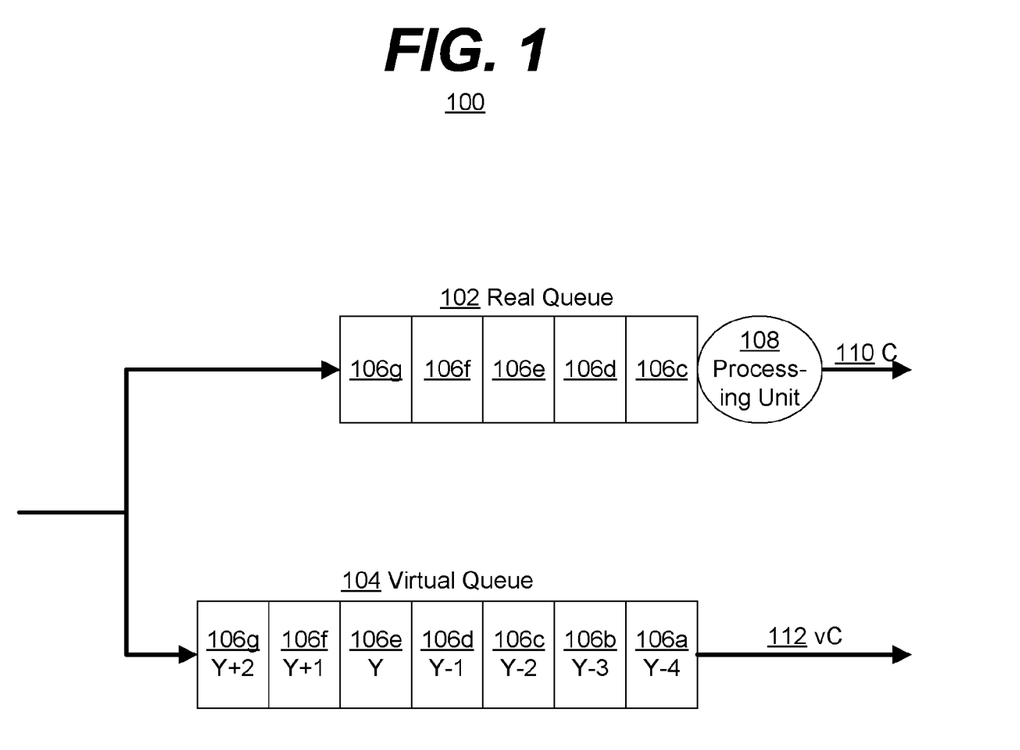
FIG. 1 is a block diagram of an embodiment of a system in accordance with the disclosed subject matter.

FIG. 1 is a block diagram of an embodiment of a system 100 for coloring packets within a network environment. In one embodiment, the system 100 may include a real queue 102 and a virtual queue 104. In one embodiment, the real queue 102 may be configured to store a series of packets or other units of data (e.g. frames, bytes, etc.; hereafter, generally referred to as "packets") for transmission. In one embodiment, the real queue 102 may store the packets in a First-In-First-Out (FIFO) fashion. In another embodiment, the real queue 102 may reorder the packets. In one embodiment, the real queue 102 may release packets to a processing unit 108 for further processing or, in one embodiment, transmission.

In one embodiment, the virtual queue 104 may be configured to provide the ability to anticipate congestion in the real queue 102 and therefore allow better control over the real queue 102. In various embodiments, the virtual queue 104 may include a queue that is merely simulated by an apparatus, computer, or processing device (e.g. a network processor, etc.) and may not physically exist in the same way the real queue 102 may exist. For example, in various embodiments, the virtual queue 104 may simply include a counter or sets of counters that indicates the size of the virtual queue 104. In such an embodiment, the virtual queue 104 may not actually contain or hold data or packets but may simulate features or the state (e.g. capacity, percentage used, etc.) of a queue if it did hold or contain such packets. In this context, a virtual queue 104 may not be a real queue but instead include elements or devices configured to simulate a real queue or portions thereof. In various embodiments, the virtual queue 104 may include a computer model of an actual physical queue.

Hereafter, the virtual queue 104 may be discussed or referred to as if it was an actual physical queue; it is understood that regardless of this abstraction the virtual queue 104 may merely simulate an actual queue and implementation details may govern how closely the simulation compares to reality. Also, in various portions below (e.g. in reference to FIG. 2), specific implementation details of how one possible embodiment of the virtual queue 104 performs the simulation of a physical queue may be described but are understood to be one possible embodiment to which the disclosed subject matter is not limited.

In one embodiment, both the real queue 102 and the virtual queue 104 may receive packets substantially simultaneously. In some embodiments, the real queue 102 may actually receive actual packets. In various embodiments, the virtual queue 104 may virtually receive a copy of the received packet or a virtual copy of the packet. As stated above, in various embodiments, the virtual queue 104 may never actually receive any packets. In one embodiment, the virtual queue 104 may include a counter that maintains a count of the amount of data associated with an equivalent queue. In such an embodiment, "virtually receiving" may include incrementing or decrementing one or more counters, as discussed in more detail below.

In one embodiment, the real queue may have a certain drain rate (C) 110. In one embodiment, the drain rate 100 may indicate how many packets are removed or released from the real queue in a certain period of time. For example, in one embodiment, the drain rate may be measured in terms of bytes per second. In one embodiment, the virtual queue 104 may have a different drain rate (vC) 112. In one embodiment, the virtual drain rate 112 may be less than or equal to the real drain rate 110. As stated above, in various embodiments, the virtual queue 104 may never actually remove or drain any packets. In an embodiment in which the virtual queue 104 makes use of counters to simulate or virtualize a queue, "virtually removing" may include incrementing or decrementing one or more counters, as discussed in more detail below.

Figure 2:
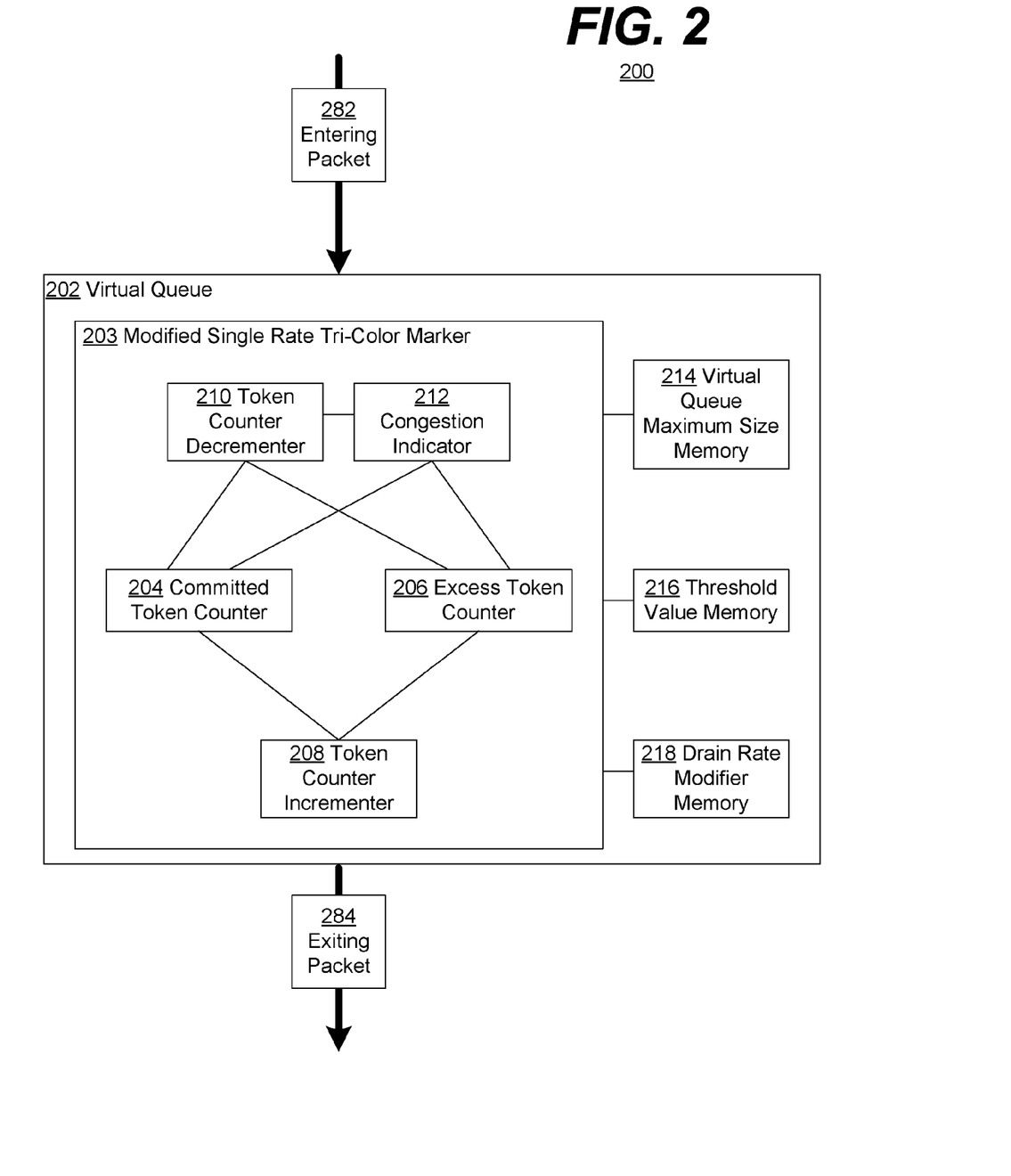
FIG. 2 is a block diagram of an embodiment of a system in accordance with the disclosed subject matter.

Therefore, in this embodiment, the virtual queue 104 may virtually contain more packets than the real queue 102 actually contains. In the illustrated embodiment, the virtual queue 104 may include or represent the series of (virtual) packets 106a, 106b, 106c, 106d, 106e, 106f, and 106g awaiting transmission. In the illustrated embodiment, the (actual) packets 106a and 106b may have already exited the real queue 102, but have already been removed or drained. As, the real queue 102 may include higher or faster drain rate 110 than the virtual queue 104. As a result, the real queue 102 may include a series of packets 106c, 106d, 106e, 106f, and 106g awaiting transmission. In one embodiment, as discussed above, the virtual queue 102 may not actually include the packets themselves, but merely a representation or count of the packets. FIG. 2, discussed below, includes a more detailed discussion of an embodiment of the virtual queue 104.

In one embodiment, the virtual queue 104 may include a threshold value (Y). In this embodiment, as long as the number of packets conceptually "in" the virtual queue 104 is less than the threshold value, the virtual queue 104 may not measure the amount of network congestion. In one embodiment, the virtual queue 104 may measure the congestion below the threshold value, but it may consider all the packets to be within the proper bandwidth limitations. In one embodiment, once the threshold value (Y) has been reached the virtual queue 104 may attempt to estimate the amount of congestion of the surplus packets.

In one embodiment, the virtual queue 104 may categorize or color the packets (virtually) within the virtual queue 104. In one embodiment, this categorization may occur after the threshold value (Y) has been reached. In another embodiment, the virtual queue 104 may continuously categorize packets. In another embodiment, the virtual queue 104 may continuously categorize packets, but may only mark (or encode their category or grade) if the threshold value (Y) has been exceeded. In one embodiment, the virtual queue 104 may indicate a categorization to be allied to real packets within the real queue 102. For example, as packet 106g virtually enters the virtual queue 104 it may be assigned a category or color. This category or color may be applied to the real packet 106g in the real queue 102.

In one embodiment, the virtual queue 104 may utilize a three color scheme (e.g. green, yellow, and red) to grade or categorize the packets. In such an embodiment, the color green may indicate that the packet is within the bandwidth limitations of the device housing the real queue 102. In such an embodiment, the color red may indicate that the transmission of the packet would exceed the bandwidth limitations of the device. In such an embodiment, the color yellow may indicate that the transmission of the packet may possibly exceed the bandwidth limitations of the device or requires special processing to fit within the bandwidth limitations of the device. It is understood that other embodiments, may utilize other grading schemes, such as, for example, numerical or Boolean schemes.

FIG. 2 is a block diagram of an embodiment of a system 200 for categorizing or coloring packets within a network environment. In one embodiment, the system 200 may include a virtual queue 202. In one embodiment, the virtual queue 202 may include a committed token counter 203, an excess token counter 206, a token counter incrementer 206, a token counter decrementer 210, and congestion indicator 212. In one embodiment, the virtual queue 202 may also include a virtual queue maximum size memory 214, a threshold value memory 216, and a drain rate modifier memory 218. In one embodiment, the virtual queue may be configured to allocate bytes or tokens such that the excess burst is filled before the committed bust is filled. In one embodiment, the excess token counter 206 may measure how full or utilized the excess burst is. Likewise, the committed token counter 203 may measure how full or utilized the committed burst is.

The workings of the virtual queue 202, in various embodiments, may be better understood by examining the embodiments of the virtual queue 202 that comprise a modified single rate tri-color marker (srTCM) 203. However, it is understood that other embodiments, may utilize other techniques may be utilized to provide the ability to anticipate congestion in the real queue 102 and therefore allow better control over the real queue 102, and are within the scope of the disclosed subject matter. In one embodiment, the modified srTCM 203 may be configured to allocate bytes or packets such that an excess burst is filled before a committed bust is filled.

In one embodiment, the modified single rate tri-color marker (srTCM) 203 may include a committed information rate (CIR). In one embodiment, the CIR may include a statistical data rate, at which the device or a user of the device may transmit data across the network. In various embodiments, the CIR may represent the bandwidth limitation of the transmitting device. In some embodiments, the CIR may be measured in terms of bytes of packets per second; although, it is understood that the above is merely one illustrative example to which the disclosed subject matter is not limited. In various embodiments, this CIR may be equivalent to the drain rate of the real queue 102 of FIG. 1.

Also, in one embodiment, the modified srTCM 203 may include a committed burst having a committed burst size (CBS). In various embodiments, the CBS may be related to bandwidth management and define an amount of data traffic that may be supported over a specific period of time. In various embodiments, the CBS may be measured in bytes or packets; although, it is understood that the above is merely one illustrative example to which the disclosed subject matter is not limited.

Furthermore, in one embodiment, the modified srTCM 203 may include an excess burst or excess burst size (EBS). In various embodiments, the EBS may represent the amount (e.g. in bytes or packets) by which the CBS may be exceeded within a given time period.

In various embodiments, one or both of the CBS and EBS may be greater than zero. In some embodiments, when the value of the CBS or the EBS is larger than zero, the non-zero burst size (CBS or EBS) may be larger than or equal to the expected size of the largest possible packet in the data transfer or stream.

In various embodiments, the modified srTCM 203 may mark the packets utilizing a three grade or category scheme. In one embodiment, these grades may be represented by the colors green, yellow, and red. In a traditional srTCM scheme, packets allocated to the committed burst are colored green, representing that they are "well behaved" and will not require special processing. Packets allocated to the excess burst are colored yellow, representing that they are "suspect" and may require special processing. All other packets are colored red, representing that they are "poorly behaved" and are expected to exceed the CIR. In one embodiment, the virtual queue 202 may include a modified srTCM 203 that does not follow this coloring scheme.

In various embodiments, the modified srTCM 203, and therefore the virtual queue 202, may include a committed token counter 204 configured to measure a number of bytes or colloquially "tokens" available to be allocated to a committed burst having a maximum token size. The conceptual framework behind the colloquial use of the term "token" may include thinking of the committed burst as a bucket that may be filled with packets or bytes. In this context a token may be thought of as an object used like money, for example exchanged or used for the right to put bytes or packets within the committed burst "bucket". As the bucket or committed burst is filled, these conceptual "tokens" are used and therefore subtracted from the committed token counter 204. As such, the committed token counter 204 may represent the number of "tokens" or bytes available to be allocated to a committed burst, as described above. Conversely, as the committed burst is drained or emptied, tokens are conceptually returned and therefore added to the committed token counter 204.

In various embodiments, the modified srTCM 203, and therefore the virtual queue 202, may also include an excess token counter 206 configured to measure a number of bytes available to be allocated to an excess burst having a maximum token size. As such, the excess burst may also be thought of as a bucket that is filled with packets or bytes. As the bucket or excess burst is filled, tokens are used and therefore subtracted from the excess token counter 206. Conversely, as the excess burst is drained or emptied, tokens are returned and therefore added to the excess token counter 206.

In one embodiment, as an entering packet 282 is (virtually) placed in the virtual queue 202, the virtual queue 202 may attempt to allocate the entering packet 282 to either the committed burst or the excess burst. In one embodiment, the committed and excess bursts sizes may be represented by a number of tokens, as described above. In one embodiment, each token may represent one byte, although other representations are possible. In one embodiment, as a packet is allocated to either the committed or excess burst the corresponding token counter 204 or 206 may be decremented to represent the current available size of the burst after the allocation. Conversely, in one embodiment, as an exiting packet 284 leaves the virtual queue 202, the proper token counter 204 or 206 may be incremented to reflect the available size of the burst after the deallocation.

In one embodiment, the packets may include or be measured in bytes. However, it is understood that bytes is merely one possible measuring scheme and that other schemes may be used, for example bits or even non-binary schemes, and are within the scope of the disclosed subject matter. In one embodiment, the virtual queue 202 or components thereof, may allocate a packet to either the committed or excess bursts in whole. Therefore, if an entering packet 282 is larger than the space available in the excess burst, it may not be broken in two but instead allocated to the committed burst. It is understood that other embodiments, that allow for the splitting of packets are within the scope of the disclosed subject matter.

It is noted that in this embodiment, a packet (e.g. packet 282) may not actually be placed within or removed from the virtual queue 202. In this embodiment, the virtual queue 202 may simply simulate a real or actual queue in terms of measuring the allocation of packets and the predicted capacity of the actual queue of a different drain rate is used. In such an embodiment, the virtual queue 202 may be configured to anticipate network congestion that may be experienced by a real queue. In this specific embodiment, the virtual queue 202 and this anticipation or categorization may be performed by a modified srTCM 203; although, it is understood that the above is merely one illustrative example to which the disclosed subject matter is not limited.

In one embodiment, the modified srTCM 203, and therefore the virtual queue 202, may include a token counter decrementor 210 configured to, as packets (virtually) enter the virtual queue 202, attempt to allocate each packet to either the committed burst or the excess burst and decrement either the committed token counter 204 or the excess token counter 206 respectively. In one embodiment, the modified srTCM 203, and therefore the virtual queue 202, may include a token counter incrementer 208 configured to, as packets (virtually) exit the virtual queue 202, increment either the committed token counter 204 or the excess token counter 206. In one embodiment, the modified srTCM 203, and therefore the virtual queue 202, may include a congestion indicator 212 configured to indicate the category or grade of packets (virtually) in the virtual queue. In one embodiment, the congestion indicator 212 may mark all packets below the threshold value (Y) with a first grade (e.g. green) and packets above the threshold with either a second or third grade (e.g. yellow or red), although other grading or coloring schemes are within the scope of the disclosed subject matter.

In one embodiment, the virtual queue 202 may include a threshold memory 216 configured to store a threshold value (Y). In one embodiment, the virtual queue 202 may include a virtual queue maximum size memory 214 configured to store a maximum size for the depth of the virtual queue 202. In one embodiment, the maximum size may be the committed burst size (CBS) plus the excess burst size (EBS). In various embodiments, the threshold value may be either the committed burst size (CBS) or the excess burst size (EBS). Furthermore, the virtual queue 202 may include a drain rate modifier memory configured to store a drain rate modifier (v), and where the virtual queue is configured to have a drain rate (vC) equal to the drain rate of the real queue (C) multiplied by the drain rate modifier (v). In various embodiments, these memories and the values stored within may be configurable before or during operation.

Two alternate embodiments of the virtual queue 202 are now described. However, it is understood that these are merely two non-limiting embodiments of the disclosed subject matter and that other techniques and schemes for utilizing, implementing, or constructing the virtual queue 202 are contemplated. The first illustrative embodiment may involve setting the committed burst size (CBS) to the threshold value (Y). The second illustrative embodiment may involve setting the excess burst size (EBS) to the threshold value (Y).

The first illustrative embodiment may include setting the committed burst size (CBS) to the threshold value (Y). In such an embodiment, the token counter incrementer 208 may be configured to, if the excess token counter 206 is less than the maximum token size of the excess burst, increment the excess token counter 206, otherwise, if the committed token counter 204 is less than the maximum token size of the committed burst, increment the committed token counter 204, otherwise, increment neither the excess token counter 206 nor the committed token counter 204. In one embodiment, the operation of the token counter incrementer 208 may occur according to the CIR of the virtual queue 202, which may in some embodiments be the modified drain rate (vC). Stated another way, as a packet (virtually) exits the virtual queue 202, an attempt may be made to (virtually) withdrawal the packet from the excess burst first. If the excess burst is already empty, the packet is (virtually) withdrawn from the committed burst, if possible. If both bursts are empty, neither token counter 204 or 206 may be incremented. Therefore, the virtual queue 202 may be configured allocate bytes or packets such that the excess burst is filled before the committed bust is filled.

In this first embodiment, the token counter decrementer 210 may be configured to, if the committed token counter 204 is greater than or equal to the number of tokens used by the entering packet, decrement the committed token counter 204, otherwise, if the excess token counter 206 is greater than or equal to the number of tokens used by the entering packet, decrement the excess token counter 206, otherwise decrement neither the excess token counter 206 nor the committed token counter 204. Stated another way, as a packet (virtually) enters the virtual queue 202, an attempt may be made to (virtually) place the packet in the committed burst first. If the committed burst is already full, the packet is (virtually) placed within the excess burst, if possible. If both bursts are full, neither token counter 204 or 206 may be decremented.

In one embodiment, the virtual queue 202, or in specific embodiments the congestion indicator 212, may be configured to operate in either a color-aware or a color-blind mode. In one embodiment, while in color-blind mode, the virtual queue 202 may assign a category, grade or color to the packets without regard to any previous color or grade assigned to the packets. Alternately in one embodiment, while in color-aware mode, the virtual queue 202 may only increase the grade of any previously graded packets (e.g. from "green" to "red" but not from "red" to "yellow"). In one embodiment, this operating mode may be altered or configured before or during operation. In other embodiments, this operating mode may be hardwired or predetermined.

In this first embodiment while in color-blind mode, the congestion indicator 212 may be configured to, if the committed token counter 204 is greater than or equal to the number of tokens used by the entering packet 282, grade the entering packet as first grade (e.g. green), otherwise if the excess token counter 206 is greater than or equal to the number of tokens used by the entering packet 282, grade the entering packet as a second grade (e.g. yellow), otherwise grading the entering packet as a third grade (e.g. red). Stated another way, if the entering packet 282 is below the threshold value (Y), which in this first embodiment is equal to the committed burst size (CBS), the packet may be marked as first grade (e.g. "well behaved", "proper", "green", etc.). Otherwise, the packet is marked as either second grade (e.g. "suspect", "questionable", "yellow", etc.), or third grade (e.g. "poorly behaved", "improper", "red", etc.).

In this first embodiment while in color-aware mode, the congestion indicator 212 may operate much the same as described as above in regard to color-blind mode. However, in one embodiment, the packet may not actually be marked until a final check is made. If the entering packet 282 is already colored or marked with a grade, the existing grade is examined. If the existing grade is higher than the grade currently determined by the congestion indicator 212 (e.g. the existing grade is "yellow" and the determined grade is "green"), the existing grade will not be altered. Conversely, in one embodiment, if the existing grade is lower than the grade currently determined by the congestion indicator 212 (e.g. the existing grade is "yellow" and the determined grade is "red"), the packet may be marked with the determined grade.

The second illustrative embodiment may include setting the excess burst size (EBS) to the threshold value (Y). In such an embodiment, the token counter incrementer 208 may be configured to, if the committed token counter 204 is less than the maximum token size of the committed burst, increment the committed token counter 204, otherwise, if the excess token counter 206 is less than the maximum token size of the excess burst, increment the excess token counter 206, otherwise, increment neither the excess token counter 206 nor the committed token counter 204. In one embodiment, the operation of the token counter incrementer 208 may occur according to the CIR of the virtual queue 202, which may in some embodiments be the modified drain rate (vC). Stated another way, as a packet (virtually) exits the virtual queue 202, an attempt may be made to (virtually) withdrawal the packet from the committed burst first. If the committed burst is already empty, the packet is (virtually) withdrawn from the excess burst, if possible. If both bursts are empty, neither token counter 204 or 206 may be incremented.

In this second embodiment, the token counter decrementer 210 may be configured to, if the excess token counter 206 is greater than or equal to the number of tokens used by the entering packet, decrement the excess token counter 206, otherwise if the committed token counter 204 is greater than or equal to the number of tokens used by the entering packet, decrement the committed token counter 204, otherwise decrement neither the excess token counter 206 nor the committed token counter 204. Stated another way, as a packet (virtually) enters the virtual queue 202, an attempt may be made to place the packet in the committed burst first. If the excess burst is already full, the packet is placed within the committed burst, if possible. If both bursts are full, neither token counter 204 or 206 may be decremented. Therefore, the virtual queue 202 may be configured allocate bytes or packets such that the excess burst is filled before the committed bust is filled.

In this second embodiment while in color-blind mode, the congestion indicator 212 may be configured to if the excess token counter 206 is greater than or equal to the number of tokens used by the entering packet 282 grading the entering packet as first grade (e.g. green), otherwise if the committed token counter 204 is greater than or equal to the number of tokens used by the entering packet 282, grading the entering packet as a second grade (e.g. yellow), otherwise grading the entering packet as a third grade (e.g. red). Stated another way, if the entering packet 282 is below the threshold value (Y), which in this second embodiment is equal to the excess burst size (EBS), the packet may be marked as first grade (e.g. "well behaved", "proper", "green", etc.). Otherwise, the packet is marked as either second grade (e.g. "suspect", "questionable", "yellow", etc.), or third grade (e.g. "poorly behaved", "improper", "red", etc.).

In this second embodiment while in color-aware mode, the congestion indicator 212 may operate much the same as described as above in regard to color-blind mode. However, in one embodiment, the packet may not actually be marked until a final check is made. If the entering packet 282 is already colored or marked with a grade or category (e.g. by another device in the data transmission path, etc.), the existing grade is examined. If the existing grade is higher than the grade currently determined by the congestion indicator 212 (e.g. the existing grade is "yellow" and the determined grade is "green"), the existing grade will not be altered. Conversely, in one embodiment, if the existing grade is lower than the grade currently determined by the congestion indicator 212 (e.g. the existing grade is "yellow" and the determined grade is "red"), the packet may be marked with the determined grade.

In various embodiments, the modified srTCM 203 may be configured to emulate a virtual queue 202 and categorize packets or data units based upon a threshold value (e.g. stored by threshold value memory 216). In one such embodiment, the modified srTCM may be configured to associate the threshold value with a maximum value of the committed token counter 204, and allocate exiting data units or packets 284 such that an excess token counter 206 is fully incremented before the committed token counter 204 is incremented, as described above. In another embodiment, the modified srTCM may be configured to associate the threshold value with a maximum value of an excess token counter 206, and allocate entering data units or packets 282 such that the excess token counter 206 is fully decremented before the committed token counter 204 is decremented, as described above.

Figure 3:
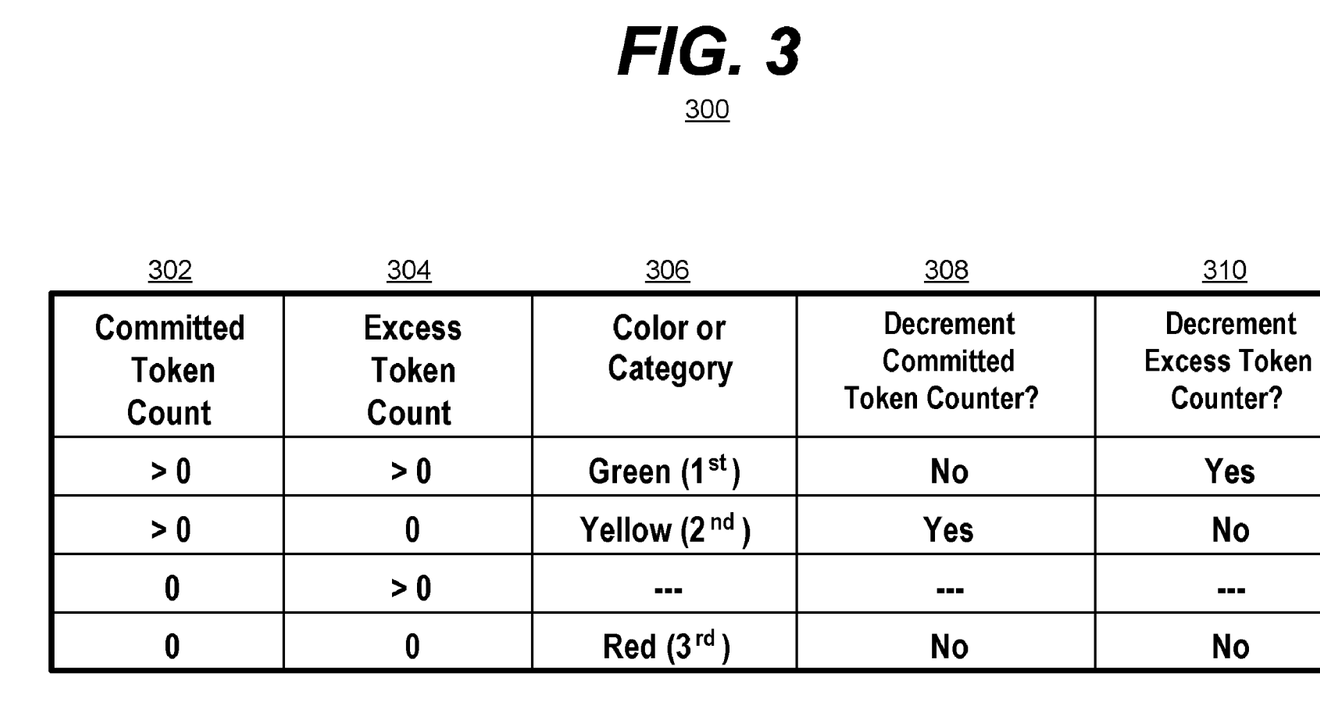
FIG. 3 is a table of an embodiment of a system in accordance with the disclosed subject matter.

FIG. 3 is a table 300 of an embodiment of a system for coloring packets within a network environment. In one embodiment, the table 300 may represent the decisions made by embodiments of the token counter decrementer 210 and congestion indicator 212 of FIG. 2 which conform to the color-blind mode of operation of the second illustrative embodiment described above. Column 302 illustrates the states of the committed token counter 204. Column 304 illustrates the states of the excess token counter 206. Column 306 illustrates the possible actions taken, in various embodiments, by the congestion indicator 212 in color-blind mode, based upon the state of the token counters 204 & 206. These actions were described above in reference to FIG. 2. Columns 308 & 310 illustrate the possible actions taken, in various embodiments, by the token counter decrementer 210, based upon the state of the token counters 204 & 206. These actions were described above in reference to FIG. 2. In this embodiment, the state where the committed token count is zero and the excess token count is greater than zero represent a state that is unlikely to occur and therefore is know in the art as a "Don't Care" condition. In one embodiment, the congestion indicator 212 and the token counter decrementer 210 may react as if both token counters where at zero; although other embodiments are possible and within the scope of the disclosed subject matter.

Figure 4:
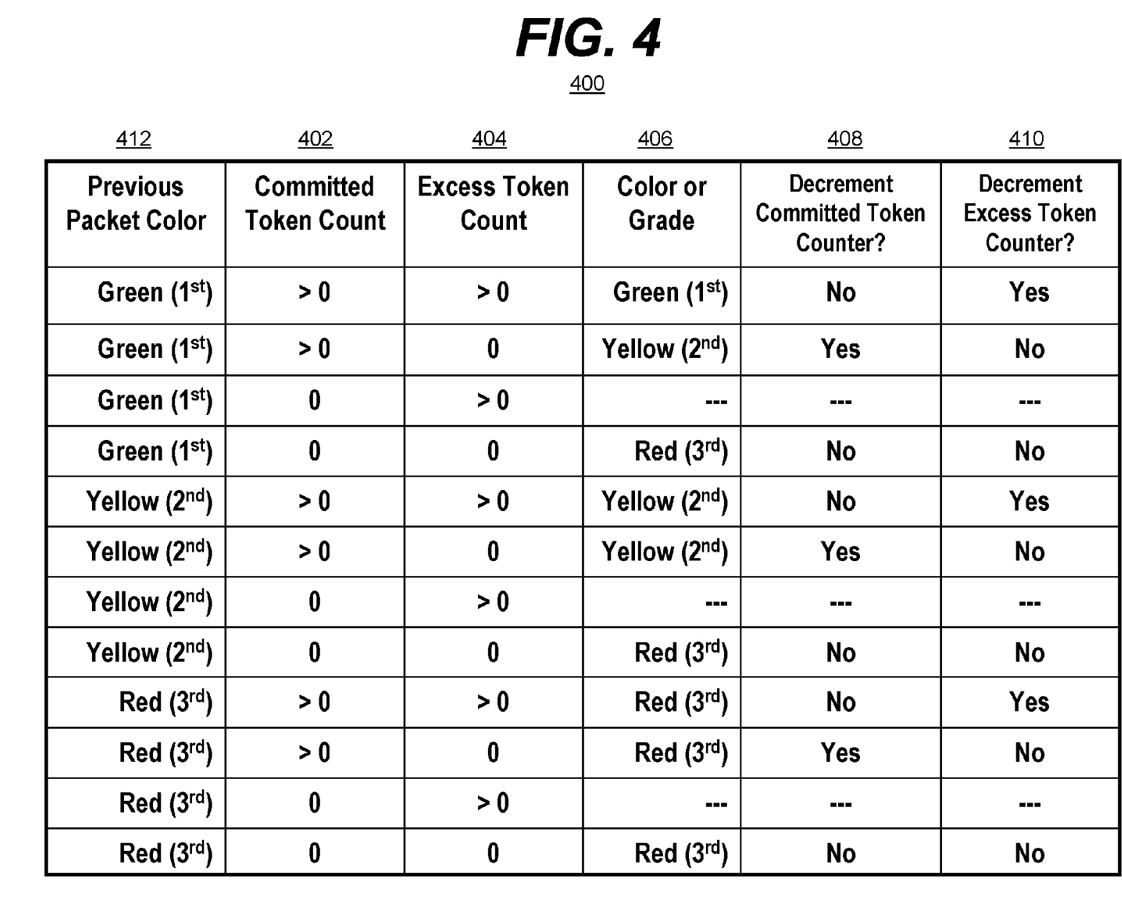
FIG. 4 is a table of an embodiment of a system in accordance with the disclosed subject matter.

FIG. 4 is a table 400 of an embodiment of a system for coloring packets within a network environment. In one embodiment, the table 400 may represent the decisions made by embodiments of the token counter decrementer 210 and congestion indicator 212 of FIG. 2 which conform to the color-aware mode of operation of the second illustrative embodiment described above. Column 412 illustrates the previously assigned or existing packet color or grade. Column 402 illustrates the states of the committed token counter 204. Column 404 illustrates the states of the excess token counter 206. Column 406 illustrates the possible actions taken, in various embodiments, by the congestion indicator 212 in color-aware mode, based upon the state of the token counters 204 & 206. These actions were described above in reference to FIG. 2. Columns 408 & 410 illustrate the possible actions taken, in various embodiments, by the token counter decrementer 210, based upon the state of the token counters 204 & 206. These actions were described above in reference to FIG. 2. In this embodiment, the state where the committed token count is zero and the excess token count is greater than zero represent a state that is unlikely to occur and therefore is know in the art as a "Don't Care" condition. In one embodiment, the congestion indicator 212 and the token counter decrementer 210 may react as if both token counters where at zero; although other embodiments are possible and within the scope of the disclosed subject matter.

Figure 5:
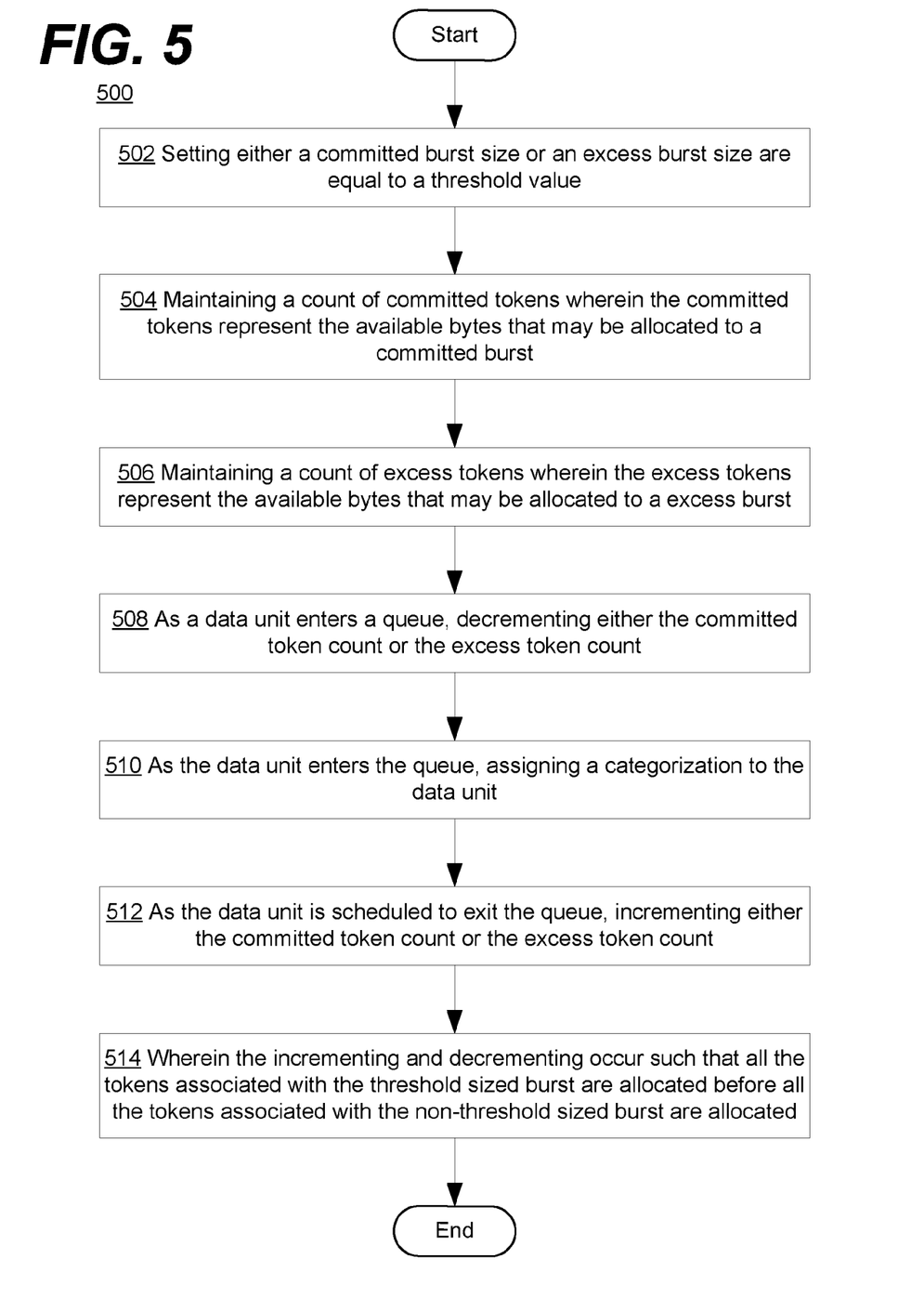
FIG. 5 is a flowchart of an embodiment of a technique in accordance with the disclosed subject matter.

FIG. 5 is a flowchart of an example embodiment of a technique 500 in accordance with the disclosed subject matter. In one embodiment, the technique illustrated by FIG. 5 may be produced by a system or apparatus as shown in FIGS. 1 and/or 2, as described above. In some embodiments, the technique illustrated by FIG. 5 may produce the results in accordance with the tables illustrated by FIGS. 3 and 4, as described above.

Block 502 illustrates that, in one embodiment, either a committed burst size or an excess burst size may be set equal to a threshold value, as described above. In various embodiments, the choice of which burst, committed or excess, is configured as the threshold burst may be a hardwired or unchangeable setting. In another embodiment, the setting may be configurable, either dynamic or static, setting. In various embodiments, the actions described above may be performed by the virtual queue 104 of FIG. 1, the virtual queue 202 of FIG. 2, or the modified srTCM 203 of FIG. 2, as described above.

Block 504 illustrates that, in one embodiment, a count of committed tokens may be maintained, as described above. In various embodiments, the committed tokens may represent the available bytes that may be allocated to a committed burst, as described above. In various embodiments, the actions described above may be performed by the virtual queue 104 of FIG. 1, or the committed token counter 204 of FIG. 2, as described above.

Block 506 illustrates that, in one embodiment, a count of excess tokens may be maintained, as described above. In various embodiments, the excess tokens may represent the available bytes that may be allocated to an excess burst, as described above. In various embodiments, the actions described above may be performed by the virtual queue 104 of FIG. 1, or the excess token counter 206 of FIG. 2, as described above.

Block 508 illustrates that, in one embodiment, as a data unit or packet enters a queue, decrementing either the committed token count or the excess token count, as described above. It is understood that, in various embodiments, "entering" the queue may include virtually entering the queue, as described above. In various embodiments, the actions described above may be performed by the virtual queue FIG. 1 or 2, or the token counter decrementer 210 of FIG. 2, as described above.

In various embodiments, where the committed burst size is equal to the threshold value, decrementing may include the following nested conditional statement: if the number of tokens associated with an entering data unit is less than or equal to the number of committed tokens, decrementing the count of committed tokens, else if the number of tokens associated with the entering data unit is less than or equal to the number of excess tokens, decrementing the count of excess tokens, otherwise decrementing neither the count of excess or committed tokens, as described above. In various embodiments, the actions described above may be performed by the virtual queue FIG. 1 or 2, or the token counter decrementer 210 of FIG. 2, as described above.

In various embodiments, where the excess burst size is equal to the threshold value decrementing may include the following nested conditional statement: if the number of tokens associated with an entering data unit is less than or equal to the number of excess tokens, decrementing the count of excess tokens, else if the number of tokens associated with the entering data unit is less than or equal to the number of committed tokens, decrementing the count of committed tokens, otherwise decrementing neither the count of excess or committed tokens, as described above. In various embodiments, the actions described above may be performed by the virtual queue FIG. 1 or 2, or the token counter decrementer 210 of FIG. 2, as described above.

Block 510 illustrates that, in one embodiment, as the data unit enters the queue, a categorization or color may be assigned to the data unit, as described above. In various embodiments, assigning may include assigning one of three categorizations to the data unit, as described above. In one embodiment, a first category, color, or grade may indicate that the data unit is not expected to cause the queue to exceed the threshold value. In one embodiment, a second category, color or grade may indicate that the data unit is expected to possibly exceed the threshold value. In one embodiment, a third category, color or grade may indicate that the data unit is expected to exceed the threshold value. Although, it is understood that the above are merely a few illustrative examples to which the disclosed subject matter is not limited. In various embodiments, the actions described above may be performed by the virtual queue FIG. 1 or 2, or the congestion indicator 212 of FIG. 2, as described above.

In various embodiments, where the committed burst size is equal to the threshold value, assigning a categorization include use of the following nested conditional statement: if the number of tokens associated with an entering data unit is less than or equal to the number of committed tokens, assigning the first category to the entering data unit, else if the number of tokens associated with the entering data unit is less than or equal to the number of excess tokens, assigning the second category to the entering data unit, otherwise assigning the third category to the entering data unit. In various embodiments, the actions described above may be performed by the virtual queue FIG. 1 or 2, or the congestion indicator 212 of FIG. 2, as described above.

In various embodiments, where the excess burst size is equal to the threshold value, assigning a categorization include use of the following nested conditional statement: if the number of tokens associated with an entering data unit is less than or equal to the number of excess tokens, assigning the first category to the entering data unit, else if the number of tokens associated with the entering data unit is less than or equal to the number of committed tokens, assigning the second category to the entering data unit, otherwise assigning the third category to the entering data unit. In various embodiments, the actions described above may be performed by the virtual queue FIG. 1 or 2, or the congestion indicator 212 of FIG. 2, as described above.

Block 512 illustrates that, in one embodiment, as the data unit is scheduled to exit the queue, either the committed token count or the excess token count may be incremented, as described above. It is understood that, in various embodiments, "exiting" the queue may include virtually exiting the queue, as described above. In various embodiments, the actions described above may be performed by the virtual queue FIG. 1 or 2, or the token counter incrementer 208 of FIG. 2, as described above.

In various embodiments, in which the committed burst size is equal to the threshold value, incrementing may include the use of the following nested conditional statement: if the number of tokens associated with the exiting data unit is less than or equal to the number of excess tokens, incrementing the count of excess tokens, else if the number of tokens associated with the exiting data unit is less than or equal to the number of committed tokens, incrementing the count of committed tokens, otherwise incrementing neither the count of excess or committed tokens. In various embodiments, the actions described above may be performed by the virtual queue FIG. 1 or 2, or the token counter incrementer 208 of FIG. 2, as described above.

In various embodiments, in which the excess burst size is equal to the threshold value, incrementing may include the use of the following nested conditional statement: if the number of tokens associated with the exiting data unit is less than or equal to the number of committed tokens, incrementing the count of committed tokens, else if the number of tokens associated with the exiting data unit is less than or equal to the number of excess tokens, incrementing the count of excess tokens, otherwise incrementing neither the count of excess or committed tokens. In various embodiments, the actions described above may be performed by the virtual queue FIG. 1 or 2, or the token counter incrementer 208 of FIG. 2, as described above.

Block 514 illustrates that, in one embodiment, that the incrementing and decrementing may occur such that all the tokens associated with the threshold sized burst (either the excess burst or the committed burst as set in Block 502) are allocated before all the tokens associated with the non-threshold sized burst (either the committed burst or the excess burst as set in Block 502) are allocated, as described above. Also, in various embodiments, the categorization may be performed in a color-blind or color-aware mode, as described above. In various embodiments, the actions described above may be performed by the virtual queue FIG. 1 or 2, or the modified srTCM 203 of FIG. 2, as described above.

Implementations of the various techniques described herein may be implemented in digital electronic circuitry, or in computer hardware, firmware, software, or in combinations of them. Implementations may implemented as a computer program product, i.e., a computer program tangibly embodied in an information carrier, e.g., in a machine-readable storage device or in a propagated signal, for execution by, or to control the operation of, data processing apparatus, e.g., a programmable processor, a computer, or multiple computers. A computer program, such as the computer program(s) described above, can be written in any form of programming language, including compiled or interpreted languages, and can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps may be performed by one or more programmable processors executing a computer program to perform functions by operating on input data and generating output. Method steps also may be performed by, and an apparatus may be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by, or incorporated in special purpose logic circuitry.

To provide for interaction with a user, implementations may be implemented on a computer having a display device, e.g., a cathode ray tube (CRT) or liquid crystal display (LCD) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations may be implemented in a computing system that includes a back-end component, e.g., as a data server, or that includes a middleware component, e.g., an application server, or that includes a front-end component, e.g., a client computer having a graphical user interface or a Web browser through which a user can interact with an implementation, or any combination of such back-end, middleware, or front-end components. Components may be interconnected by any form or medium of digital data communication, e.g., a communication network. Examples of communication networks include a local area network (LAN) and a wide area network (WAN), e.g., the Internet.

While certain features of the described implementations have been illustrated as described herein, many modifications, substitutions, changes and equivalents will now occur to those skilled in the art. It is, therefore, to be understood that the appended claims are intended to cover all such modifications and changes as fall within the scope of the embodiments.

What is claimed is:

1. An apparatus comprising:
    a real queue configured to actually receive data units; and
    a virtual queue configured to:
        virtually receive virtual data units as the data units are actually received by a real queue,
        virtually dispatch virtual data units at a drain rate that differs from and is a predefined multiple of a drain rate of the real queue, wherein the virtual queue is configured to maintain a committed token count and an excess token count; and wherein the committed token count is configured to represent a number of bytes available to be allocated to a committed burst having a maximum size;
    wherein the maximum token size of the committed burst is a threshold value; and
    wherein the virtual queue is configured to, in response to a data unit virtually exiting the virtual queue:
        if the excess token count is less than the maximum token size of an excess burst, increase the excess token count,
        otherwise, if the committed token count is less than the maximum token size of the committed burst, increase the committed token count,
        otherwise, increase neither the excess token count nor the committed token count.

2. The apparatus of claim 1 wherein the virtual queue includes a drain rate modifier memory configured to store a drain rate modifier; and
    wherein the virtual queue is configured to have a drain rate equal to a drain rate of the real queue multiplied by the drain rate modifier.

3. The apparatus of claim 1 wherein the virtual queue further comprises a threshold value memory configured to store a threshold value representing the maximum amount of data that can be virtually stored by the virtual queue; and
    wherein the congestion indicator is configured to, if virtually placing a data unit within the virtual queue would exceed the threshold value, categorize the data unit as either second grade or third grade.

4. The apparatus of claim 3 wherein the virtual queue includes a configurable virtual queue maximum size memory configured to store a maximum size for the virtual depth of the virtual queue, wherein the maximum size is the maximum token size of a committed burst plus the maximum token size of an excess burst.

5. The apparatus of claim 1 wherein the virtual queue is configured to operate in either a color-aware or a color-blind mode;
    wherein if the virtual queue is configured to operate in a color-aware, the virtual queue is configured to only either increase or maintain the categorization of any previously categorized data units; and
    wherein if the virtual queue is configured to operate in a color-blind mode, the virtual queue is configured to categorize data units regardless of any previously categorization assigned to the data units.

6. The apparatus of claim 1 wherein the virtual queue is configured to:
    if the committed token count is greater than or equal to a number of tokens used by the entering data unit categorizing the entering data unit as a proper data unit,
    otherwise, if the excess token count is greater than or equal to the number of tokens used by the entering data unit, categorizing the entering data unit as a questionable data unit,
    otherwise, categorizing the entering data unit as an improper data unit.

7. The apparatus of claim 1 wherein the virtual queue is further configured to provide congestion feedback information based upon a category given to each of the entering virtual data units.

8. An apparatus comprising:
    a real queue configured to actually receive data units; and
    a virtual queue configured to:
        virtually receive virtual data units as the data units are actually received by a real queue,
        virtually dispatch virtual data units at a drain rate that differs from and is a predefined multiple of a drain rate of the real queue, wherein the virtual queue is configured to maintain a committed token count and an excess token count; and wherein the excess token count is configured to represent a number of bytes available to be allocated to an excess burst having a maximum size,
    wherein the maximum token size of the excess burst is a threshold value; and
    wherein the virtual queue is configured to:
        if the excess token count is greater than or equal to a number of tokens used by the entering data unit decreasing the excess token count,
        otherwise, if the committed token count is greater than or equal to the number of tokens used by the entering data unit, decreasing the committed token count,
        otherwise, decreasing neither the excess token count nor the committed token count.

9. The apparatus of claim 8 wherein the virtual queue is configured to:
    if the excess token count is greater than or equal to the number of tokens used by the entering data unit categorizing the entering data unit as a proper data unit,
    otherwise, if the committed token count is greater than or equal to the number of tokens used by the entering data unit, categorizing the entering data unit as a questionable data unit,
    otherwise, categorizing the entering data unit as an improper data unit.

10. The apparatus of claim 8 wherein the virtual queue is further configured to provide congestion feedback information based upon a category given to each of the entering virtual data units.

11. A method comprising:
    storing data units in a queue comprising memory elements;
    as a data unit enters the queue, decrementing either a committed token counter or a excess token counter, wherein the committed token counter and the excess token counter are respectively associated with a committed burst size and a excess burst size;
    as the data unit enters the queue, assigning a categorization to the data unit;
    incrementing either the committed token count or the excess token count; and
    wherein the incrementing and decrementing occur such that all the tokens associated with a threshold sized burst are allocated before all the tokens associated with the non-threshold sized burst are allocated, wherein assigning a categorization includes assigning one of three categorizations to the data unit; and
    wherein a first category indicates that the data unit is not expected to cause the queue to exceed the threshold value, a second category indicates that the data unit is expected to possibly exceed the threshold value, and a third category indicates that the data unit is expected to exceed the threshold value.

12. The method of claim 11, wherein the decrementing comprises fully decrementing the excess token counter before decrementing the committed token counter so that an excess burst is filled before a committed burst is filled.

13. The method of claim 11 wherein the incrementing comprises incrementing, at a second rate, either the committed token count or the excess token count, wherein the stored data units exit the queue at a first rate and wherein the second rate is slower than the first rate and a predefined multiple of the first rate.

14. The method of claim 11 wherein the committed burst size is equal to the threshold value; and
    wherein assigning a categorization includes:
    if the number of tokens associated with an entering data unit is less than or equal to the number of committed tokens, assigning the first category to the entering data unit,
    else if the number of tokens associated with the entering data unit is less than or equal to the number of excess tokens, assigning the second category to the entering data unit,
    otherwise assigning the third category to the entering data unit.

15. The method of claim 11 wherein the excess burst size is equal to the threshold value; and
    wherein incrementing includes:
    if the number of tokens associated with the exiting data unit is less than or equal to the number of committed tokens, incrementing the count of committed tokens,
    else if the number of tokens associated with the exiting data unit is less than or equal to the number of excess tokens, incrementing the count of excess tokens,
    otherwise incrementing neither the count of excess or committed tokens.

16. The method of claim 11 wherein the excess burst size is equal to the threshold value; and
    wherein decrementing includes:
    if the number of tokens associated with an entering data unit is less than or equal to the number of excess tokens, decrementing the count of excess tokens,
    else if the number of tokens associated with the entering data unit is less than or equal to the number of committed tokens, decrementing the count of committed tokens,
    otherwise decrementing neither the count of excess or committed tokens.

17. The method of claim 11 wherein the excess burst size is equal to the threshold value; and
    wherein assigning a categorization includes:
    if the number of tokens associated with an entering data unit is less than or equal to the number of excess tokens, assigning the first category to the entering data unit,
    else if the number of tokens associated with the entering data unit is less than or equal to the number of committed tokens, assigning the second category to the entering data unit,
    otherwise assigning the third category to the entering data unit.

18. An apparatus comprising:
    a modified single rate tri-color marker (srTCM) configured to emulate a virtual queue and categorize data units based upon a threshold value, wherein the virtual queue includes a drain rate that is a predefined multiple of a drain rate of a corresponding real queue;
    wherein the modified srTCM is configured to:
    associate the threshold value with a maximum value of an excess token counter;
    allocate entering data units such that the excess token counter is fully decremented before a committed token counter is decremented so that an excess burst is filled before a committed burst is filled; and
    assign a categorization to the data unit, including assigning one of three categorizations to the data unit, wherein a first category indicates that the data unit is not expected to cause the queue to exceed the threshold value, a second category indicates that the data unit is expected to possibly exceed the threshold value, and a third category indicates that the data unit is expected to exceed the threshold value.

19. The apparatus of claim 18 wherein the modified srTCM is configured to:
    associate the threshold value with a maximum value of the committed token counter; and
    allocate exiting data units such that the excess token counter is fully incremented before the committed token counter is incremented.

20. A method comprising:
    storing data units in a queue comprising memory elements;
    as a data unit enters the queue, decrementing either a committed token counter or a excess token counter, wherein the committed token counter and the excess token counter are respectively associated with a committed burst size and a excess burst size;
    as the data unit enters the queue, assigning a categorization to the data unit;
    incrementing either the committed token count or the excess token count; and
    wherein the incrementing and decrementing occur such that all the tokens associated with a threshold sized burst are allocated before all the tokens associated with the non-threshold sized burst are allocated;
    wherein the committed burst size is equal to the threshold value; and
    wherein incrementing includes:
    if the number of tokens associated with the exiting data unit is less than or equal to the number of excess tokens, incrementing the count of excess tokens,
    else if the number of tokens associated with the exiting data unit is less than or equal to the number of committed tokens, incrementing the count of committed tokens, otherwise incrementing neither the count of excess or committed tokens.

21. A method comprising:

emulating a virtual queue and categorizing data units based upon a threshold value, wherein the virtual queue includes a drain rate that is a predefined multiple of a drain rate of a corresponding real queue;

associating the threshold value with a maximum value of an excess token counter;

allocating entering data units such that the excess token counter is fully decremented before a committed token counter is decremented so that an excess burst is filled before a committed burst is filled; and assigning a categorization to the data unit, including assigning one of three categorizations to the data unit, wherein a first category indicates that the data unit is not expected to cause the queue to exceed the threshold value, a second category indicates that the data unit is expected to possibly exceed the threshold value, and a third category indicates that the data unit is expected to exceed the threshold value.

22. The method of claim 21 and further comprising:

associating the threshold value with a maximum value of the committed token counter; and allocating exiting data units such that the excess token counter is fully incremented before the committed token counter is incremented.

23. A method comprising:

storing data units in a queue comprising memory elements;

as a data unit enters the queue, decrementing either a committed token counter or a excess token counter, wherein the committed token counter and the excess token counter are respectively associated with a committed burst size and a excess burst size;

as the data unit enters the queue, assigning a categorization to the data unit;

incrementing either the committed token count or the excess token count; and wherein the incrementing and decrementing occur such that all the tokens associated with a threshold sized burst are allocated before all the tokens associated with the non-threshold sized burst are allocated;

wherein the committed burst size is equal to the threshold value; and wherein decrementing includes:

if the number of tokens associated with an entering data unit is less than or equal to the number of committed tokens, decrementing the count of committed tokens, else if the number of tokens associated with the entering data unit is less than or equal to the number of excess tokens, decrementing the count of excess tokens, otherwise decrementing neither the count of excess or committed tokens.

\* \* \* \* \*

UNITED STATES PATENT AND TRADEMARK OFFICE
CERTIFICATE OF CORRECTION

PATENT NO.       : 8,274,896 B2  
APPLICATION NO.  : 12/253038  
DATED            : September 25, 2012  
INVENTOR(S)      : Ashvin Lakshmikantha et al.

It is certified that error appears in the above-identified patent and that said Letters Patent is hereby corrected as shown below:

In column 14, line 5, in claim 5, delete "color-aware," and insert -- color-aware mode, --, therefor.

Signed and Sealed this
Fourth Day of December, 2012

David J. Kappos
*Director of the United States Patent and Trademark Office*